April 27, 1954 W. STEELE 2,676,695
BROADCAST SEEDER
Filed May 9, 1951 3 Sheets-Sheet 1

INVENTOR
WALTER STEELE
BY Carlsen & Hagle
ATTORNEYS

April 27, 1954

W. STEELE 2,676,695

BROADCAST SEEDER

Filed May 9, 1951

INVENTOR
WALTER STEELE

BY Carlsen & Hagle

ATTORNEYS

April 27, 1954 W. STEELE 2,676,695
BROADCAST SEEDER
Filed May 9, 1951 3 Sheets-Sheet 3
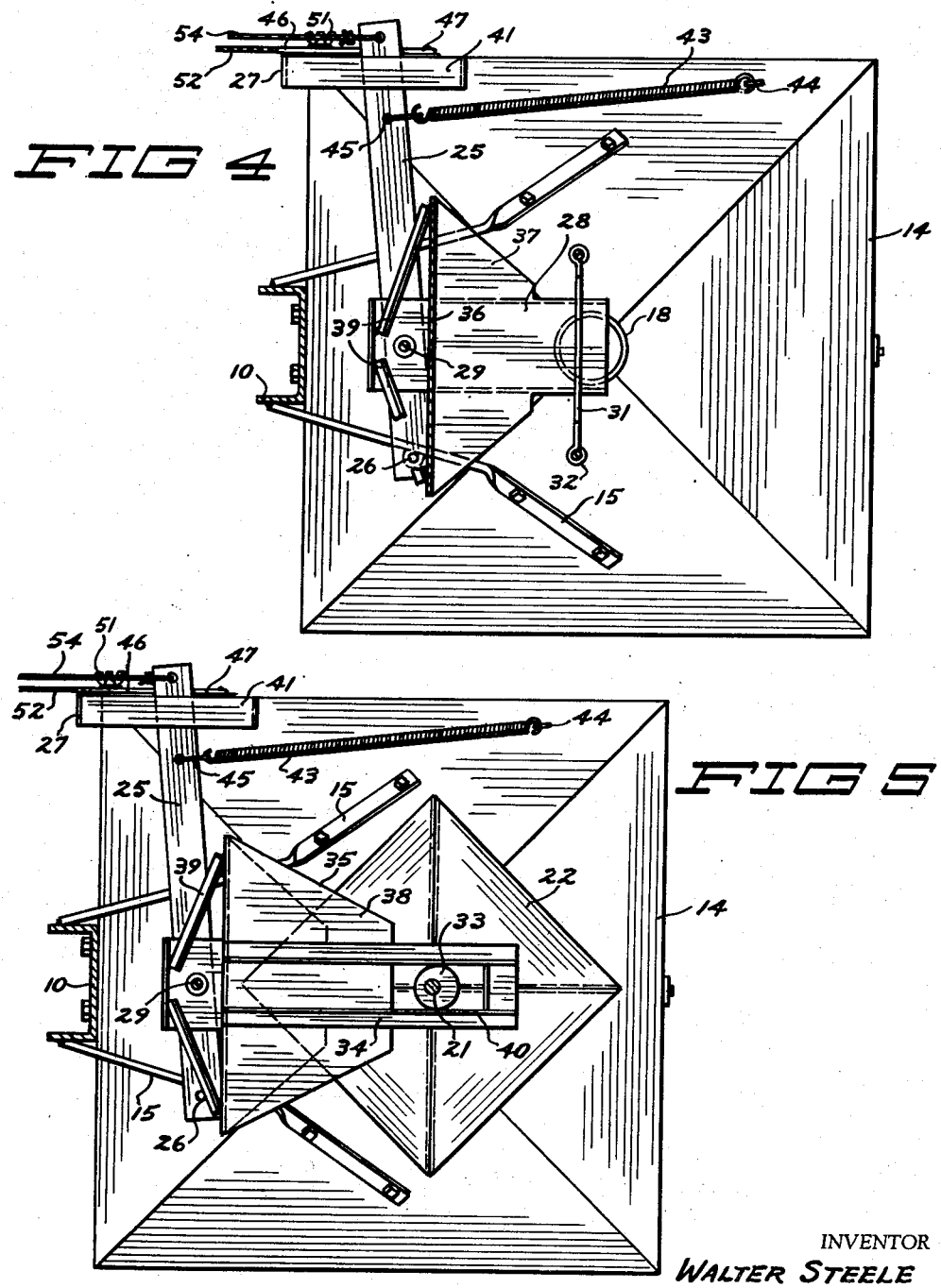
INVENTOR
WALTER STEELE
BY Carlsen & Hagle
ATTORNEYS Patented Apr. 27, 1954

2,676,695

UNITED STATES PATENT OFFICE 2,676,695

BROADCAST SEEDER

Walter Steele, Albert Lea, Minn.

Application May 9, 1951, Serial No. 225,448

1 Claim. (Cl. 198—128)

This invention relates generally to mechanism for spreading or broadcasting loose material such as seed or fertilizer and more particularly to such mechanism adapted for attachment to and use with a tractor.

The primary object of the invention is to provide a seeding device adapted to broadcast seed uniformly in all lateral directions.

Another object of the invention is to provide a seeder having a hopper and a centrifugal scatterer below the hopper with an improved means of insuring a continuous flow of seed from the hopper to the scatterer.

Still another object of the invention is to provide a seeder having a scattering plate to broadcast seed by centrifugal action, wherein the plate is so formed as to insure even distribution of the seed.

Still another object of the invention is to provide a seed broadcasting attachment for tractors or the like which has its own source of power operating independently of its carrying means.

Still another object of the invention is to provide a seed broadcasting device having an improved means for regulating the amount of seed which it distributes.

Still another object of the invention is to provide a seed broadcaster for attachment to a tractor having means whereby termination or resumption of the flow of seed might be controlled from a remote point such as by the operator in the tractor seat.

With these and other objects in mind the invention broadly comprises a seed broadcaster attachment for a tractor or the like having a hopper with a bottom opening for drainage of the seed therefrom, a centrifugal scattering plate under the opening, self-contained power means for spinning the plate, an eccentric associated with the power means, a seed slide mounted for opening and closing over the hopper opening, connection between the slide and eccentric for oscillating the slide, and means for locking the slide in various adjusted positions relative to the hopper opening for regulating the rate of flow of the seed therethrough.

The above mentioned and still further objects will be brought to light during the course of the following specification, reference being made to the accompanying drawings, in which—

Fig. 4 is an inverted plan view of the machine taken on line 4—4 of Fig. 1.

Fig. 5 is similar to Fig. 4 but taken on the slightly lower line 5—5 of Fig. 1.

Figure 2:
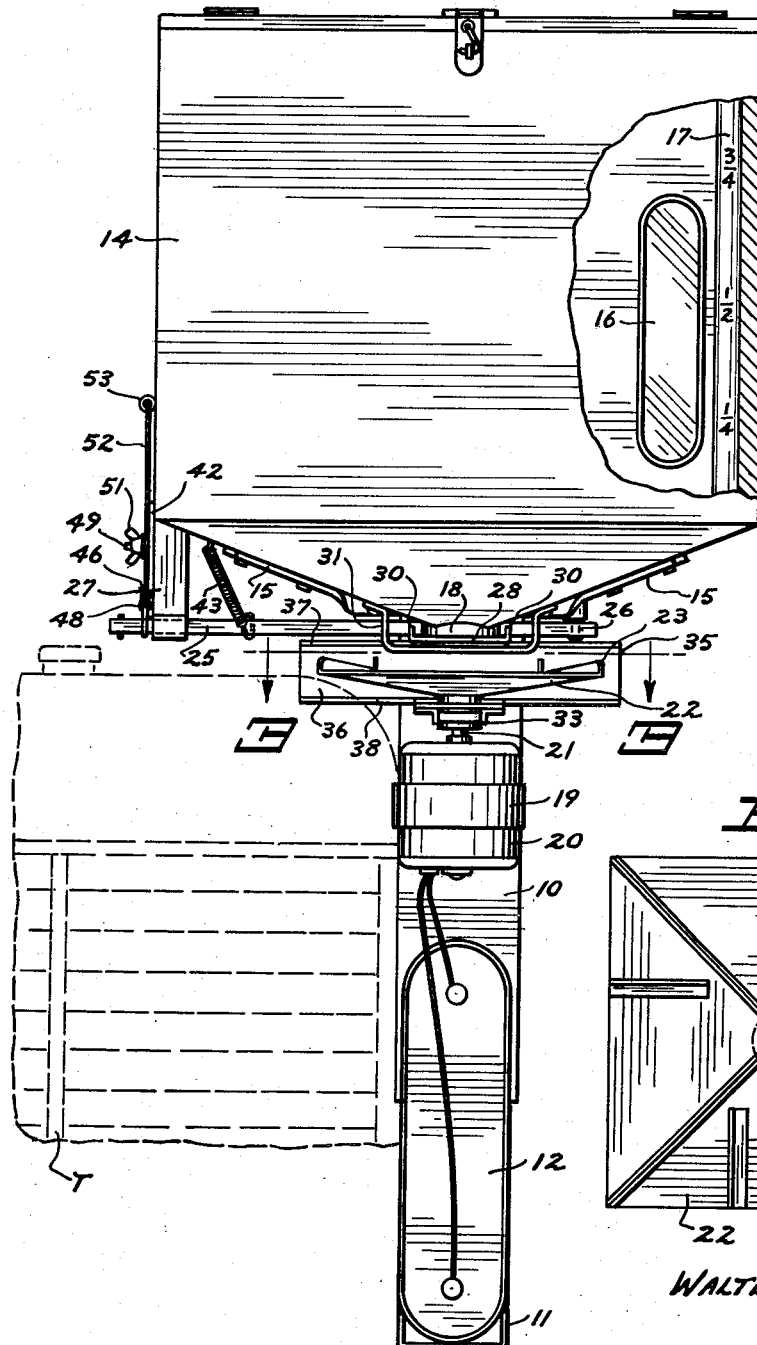
Fig. 2 is a front elevation showing the device mounted on the front end of a tractor and with the seed hopper partially broken away to show the hopper content window and gauge.

Referring now more particularly to the drawings and using reference characters, the numeral 10 denotes an upright mounting member adapted for attachment to a tractor or other ground traveling vehicle or implement. A bracket 11 is rigidly secured to the lower end of member 10 for seating a battery such as the dry cell 12 which may be secured in the bracket by the band 13. On the upper portion of the member 10 is bolted a hopper 14 having a hinged cover. Rigid arms 15 extend outwardly from the member 10 and are secured to the bottom of the hopper (Fig. 4) to aid in supporting the hopper. The hopper is provided on its rear or frame mounted wall with an elongated vertically disposed window 16 (Fig. 2) through which the level of seed in the hopper can be viewed by the tractor operator. A gauge 17 is also provided in one corner of the hopper for a more accurate measure of the hopper contents. The bottom of the hopper is formed to slope downward toward its center where it has an outlet opening fitted with a short discharge tube 18 through which seed drains from the hopper.

The mechanism for broadcasting the seed as it drains from the bottom of the hopper will now be described. Intermediate the hopper 14 and the battery bracket 11, a motor support bracket 19 is provided being rigidly associated with the member 10 and extending perpendicularly therefrom under the hopper. This bracket supports a motor 20 as shown with the drive shaft 21 of the motor extending vertically upward in longitudinal alignment with but slightly forward of the discharge tube 18. The centrifugal scattering plate is designated generally by the numeral 22 and is mounted at the end of shaft 21 and centered thereon for revolution substantially on a horizontal plane. This scatterer has a square shallow bottom construction with ribs 23 extending corner to corner across the upper surface thereof dividing the plate into triangular sections and short rib members 24 disposed at right angles to the sides of the plate and near the trailing rib 23 of each section as the scatterer is spun.

Figure 3:
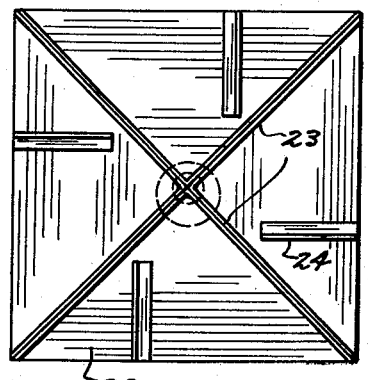
Fig. 3 is a plan view of the improved distributing plate taken on line 3—3 of Fig. 2.

It will now be recognized that, when the hopper 14 is filled with seed which is allowed to drain through tube 18, the seed will drop upon the plate 22 which is rapidly rotated, in the direction which is counterclockwise when viewing the plate from above as in Fig. 3, by the battery operated motor 20. With the spinning axis of the plate slightly forward of the tube 18 the seed will obviously fall in equal amounts into the various sections formed by ribs 23. The seed lying in each section tends to gather against the rearmost traveling wall of the section and then move outwardly along said wall and off the plate by centrifugal force. The member 24 in each plate section serves to break up the bulk of the outwardly flowing seed to equalize distribution.

There is also provided an agitation and cut-off mechanism which insures and regulates the flow of seed from the hopper to the distributor plate. This mechanism will now be described. An arm 25 is mounted to extend transversely under the hopper intermediate the frame member 10 and the tube 18. This arm is movable on a horizontal plane having one end pivotally connected at 26 to hopper support 15 at one side of the hopper and its other end slidable in a guide means 27 mounted on the opposing side of the hopper and to be subsequently described.

A seed cut-off slide 28 has its rear end pivoted at 29 on the arm 25 and extends forwardly across the lower end of tube 18. The forward end portion of the slide is channeled having side walls 30 which extend upwardly at either side of the tube. A U-shaped wire guide 31 is secured to the hopper bottom as at points 32 with its bight portion crossing under slide 25 to support the extended end of the slide against the tube 18 in such a manner as to allow the slide free longitudinal sliding movement. It is to be noted that the walls 30 are spaced slightly from both the tube and the upright portions of the member 31 to allow the slide slight lateral play about its pivot 29.

On the motor driven shaft 21 and immediately below the scattering device 22 there is provided the shaft with an eccentric collar 33. This collar is engaged by a rearwardly extending eccentric strap 34 which is rigidly associated with the slide 28 by means of a deflector shield, designated generally at 35. The shield has a channel shape with the bottom 36 of the channel forming a wide deflection plate to the rear of scattering device 22, and the sides 37 and 38 thereof, respectively, extending forwardly and rigidly connected to the slide plate 28 and eccentric strap 34, above and below the plate 22. A pair of diagonally slanting braces 39 disposed behind the shield 35 and extending from the shield to the slide 28 aids in maintaining the rigid association of these members. The eccentric strap 34 has a longitudinal slot 40 (Fig. 5) substantially longer than but only slightly wider than the diameter of the eccentric collar 33 and in which the collar lies allowing the strap to be moved outwardly or inwardly relative to member 22 as desired but prohibiting revolution of the collar without lateral movement of the strap.

It will now be understood that as the shaft 21 is revolved by the motor 20 as to spin the plate 22, the eccentric 33 on the shaft acting against the side edges of the opening 40 in the strap 34 will cause the strap to oscillate rapidly on a horizontal plane. The connection between the member 34 and slide 28 being rigid through the member 35, the oscillation will be transmitted to the slide. This rapid lateral vibration of the slide 28 partially covering tube 18 insures a continuous flow of seed through the tube and onto the scattering plate.

Figure 1:
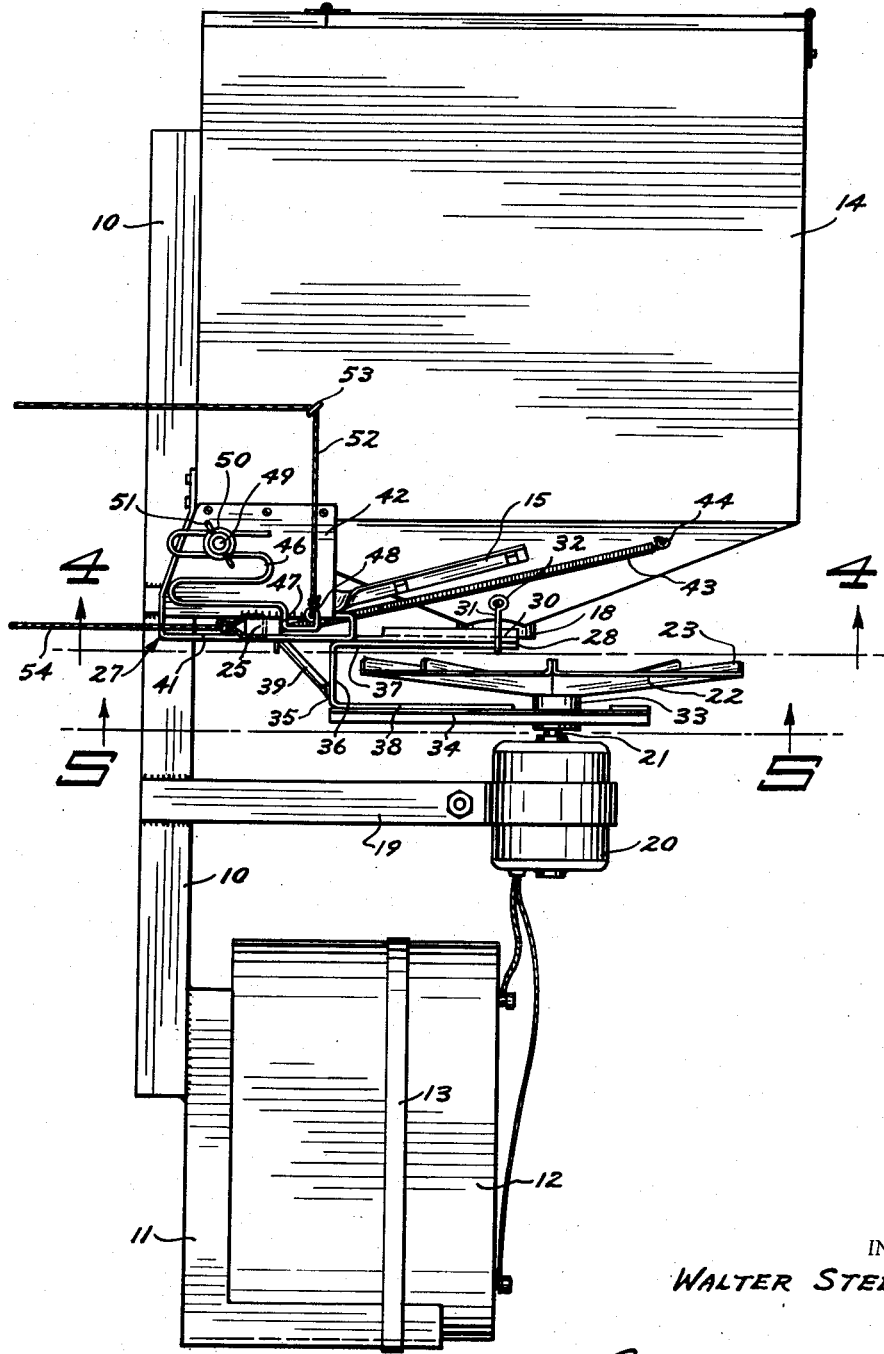
Fig. 1 is a side elevation of the invention.

The cut-off slide 28 is adjustable longitudinally between a forwardmost closed position completely blocking the discharge end of tube 18 and various open positions by movement of arm 25 about its pivot 26. The distal end of this arm may be locked in various positions in the guide 27 by a device now to be described. The guide 27 comprises a strap attached to the rear side of the hopper to depend therefrom. The lower portion of the strap is formed in an elongated forwardly extending loop 41 through which the arm 25 extends for limited fore and aft movement. A plate 42 is mounted on the side of the hopper and connects along its lower edge with the loop 41. A long spiral spring 43 has one end connected to a forward point on the hopper bottom as at 44 and its other end connected at 45 to the arm 25 so as to constantly urge the arm toward its forwardmost position. A piece of resilient wire is formed into a latching member 46, being bent back upon itself in U-shaped bends as shown in Fig. 1 with one terminal portion thereof configured as at 47 to form a latch and having an eye 48 at its very end. The latch member is secured to the plate 42 by a bolt 49 coming through the plate from the inner side and carrying a washer 50 and wing nut 51 on its threaded portion with opposing arms of the uppermost U-bend in the wire being held securely between plate 42 and the washer 50. When so mounted the latch portion 47 of the member 46 extends downwardly to lock the arm 25 against forward movement urged by tension of the spring 43. The member 46 is adjustable longitudinally on plate 42 merely by unscrewing the wing nut 51, moving the member to its desired position, and retightening the nut. With such longitudinal adjustment of the latch member it will be obvious that the forward position of the slide 28 and the resultant flow of seed through tube 18 is controlled.

For completely shutting off the seed flow there is provided a control cord or chain 52 having one end secured to the eye 48 on the latch member then extending upwardly through an eye 53 on the hopper and rearwardly to a place where it might be conveniently pulled by the tractor operator. There is also a cord or chain 54 connected to the end of the arm 25 and extending rearwardly also for actuation by the operator. It will now be understood that if the operator desires to terminate the seeding for only a brief period he may do so by pulling the cord 52. This raises the latch 47 out of engagement with the arm 25 allowing the spring 43 to pull the arm and the attached cut-off slide 28 forward to a position where the slide completely covers the lower end of tube 18. When it is then desired to resume the seeding operation a pull on the cord 54 will move the arm 25 rearwardly until the latch 47 is allowed to slip over the arm as the member 46 recoils to its normal condition, it being understood that the member 46 is placed under tension as latch portion 47 is raised.

The seeding operation may accordingly be quickly terminated without disconnecting the broadcaster from its battery 12. Of course, any other suitable source of power may be used, such as the tractor battery, ground wheels or the like. However, it is found to be a very desirable feature to provide the machine with its own battery as shown so that it might be conveniently and simply mounted on any type of wheeled implement.

With the improved contrifugal scatterer 22 it is found that the seed is broadcasted uniformly in all directions, the various ribs 23 and 24 serving to prohibit the throwing of a large bulk of seed in any one direction. Also the broad deflector wall 36 aids in scattering the seed in only the desired directions.

While the broadcaster has been here shown and described as being mounted on the front of a carrying vehicle in such a position as to scatter the seed forwardly and sidewardly therefrom, it may, obviously, also be mounted at the side or rear of the vehicle if such is more convenient.

I have thus provided a seed broadcasting machine which economically and efficiently carries out the aforementioned objectives. It is understood that suitable modifications may be made in the structure as disclosed, provided such modifications come within the spirit and scope of the appended claim. Having now therefore fully illustrated and described my invention, what I claim to be new and desire to protect by Letters Patent is:

A seed distributing fan comprising a broadwise symmetrical plate member adapted for spinning rotation about its center on a vertical axis, said plate having a plurality of ribs on its upper surface extending radially from the center to the plate edge so that as seed is deposited on the plate it will flow outwardly by centrifugal force along said ribs to the edge of the plate, and a non-radially directed rib located immediately forwardly of each first mentioned rib relative to the direction of rotation, said last mentioned rib extending from the edge of the plate toward said first mentioned rib and terminating short thereof leaving only a narrow passage between the ribs through which the seed can flow.

References Cited in the file of this patent

UNITED STATES PATENTS

| Number | Name | Date |
|---|---|---|
| 439,025 | Schaefer et al. | Oct. 21, 1890 |
| 892,553 | Roby et al. | July 7, 1903 |
| 1,173,451 | Matthews | Feb. 29, 1916 |
| 2,243,939 | Arndt | June 3, 1941 |
| 2,244,480 | Arndt | June 3, 1941 |
| 2,334,376 | Bauer | Nov. 16, 1943 |
| 2,535,414 | Heidger | Dec. 26, 1950 |
| 2,547,143 | Speicher | Apr. 3, 1951 |
| 2,561,002 | Weeks | July 17, 1951 |

FOREIGN PATENTS

| Number | Country | Date |
|---|---|---|
| 443,790 | France | Oct. 2, 1912 |
| 513,386 | Germany | Nov. 26, 1930 |